United States Patent
Liu et al.

(10) Patent No.: US 12,330,362 B2
(45) Date of Patent: Jun. 17, 2025

(54) METHOD OF INCREASING BUBBLE STABILITY OF A POLYETHYLENE RESIN

(71) Applicant: Univation Technologies, LLC, Houston, TX (US)

(72) Inventors: Bo Liu, Lake Jackson, TX (US); Joel D. Wieliczko, South Charleston, WV (US); Ayush A. Bafna, Manvel, TX (US); Daudi A. Abe, The Woodlands, TX (US)

(73) Assignee: Univation Technologies, LLC, Houston, TX (US)

( * ) Notice: Subject to any disclaimer, the term of this patent is extended or adjusted under 35 U.S.C. 154(b) by 191 days.

(21) Appl. No.: 17/754,785

(22) PCT Filed: Oct. 26, 2020

(86) PCT No.: PCT/US2020/057280
§ 371 (c)(1),
(2) Date: Apr. 12, 2022

(87) PCT Pub. No.: WO2021/086767
PCT Pub. Date: May 6, 2021

(65) Prior Publication Data
US 2024/0293965 A1    Sep. 5, 2024

Related U.S. Application Data

(60) Provisional application No. 62/926,745, filed on Oct. 28, 2019.

(51) Int. Cl.
*B29C 48/14*    (2019.01)
*B29C 48/00*    (2019.01)
(Continued)

(52) U.S. Cl.
CPC ............ *B29C 48/14* (2019.02); *B29C 48/022* (2019.02); *B29C 48/802* (2019.02); *B29C 48/92* (2019.02);
(Continued)

(58) Field of Classification Search
None
See application file for complete search history.

(56) References Cited

U.S. PATENT DOCUMENTS

| | | |
|---|---|---|
| 5,739,266 A | 4/1998 | Piana |
| 5,882,750 A | 3/1999 | Mink et al. |

(Continued)

FOREIGN PATENT DOCUMENTS

| | | |
|---|---|---|
| CA | 2226183 A1 | 1/1997 |
| WO | 2019083716 A1 | 5/2019 |

OTHER PUBLICATIONS

UPAC's Compendium of Chemical Terminology. Gold Book, version 2.3.3, Feb. 24, 2014.

(Continued)

*Primary Examiner* — Ha S Nguyen (57) ABSTRACT

A method of increasing bubble stability of a needful high molecular weight bimodal high-density polyethylene resin in need thereof, the method comprising subjecting the needful high molecular weight bimodal high-density polyethylene resin to a determined amount of oxygen tailoring of the resin so as to independently increase both the resin's melt storage modulus G' (at G"=3000 pascals) and complex viscosity ratio SH1000, and thereby make an oxygen-tailored high molecular weight bimodal high-density polyethylene resin having a targeted increase in bubble stability. The method uses a tailoring effective amount of molecular oxygen ($O_2$) to achieve the desired oxygen tailoring. The method uses these advanced rheological properties from (Continued)

dynamic mechanical spectroscopy, but analyzes the data in a different way that is more sensitive to changes in resin composition and properties, and yet achieves a resin regime having a targeted increase in bubble stability.

11 Claims, 2 Drawing Sheets

(51) Int. Cl.
    *B29C 48/40*     (2019.01)
    *B29C 48/80*     (2019.01)
    *B29C 48/92*     (2019.01)
    *C08F 210/16*     (2006.01)
    *C08J 5/18*     (2006.01)
    *B29K 23/00*     (2006.01)

(52) U.S. Cl.
    CPC ............... *C08F 210/16* (2013.01); *C08J 5/18* (2013.01); *B29C 48/0018* (2019.02); *B29C 2948/92009* (2019.02); *B29C 2948/922* (2019.02); *B29C 2948/92333* (2019.02); *B29C 2948/92504* (2019.02); *B29C 2948/92857* (2019.02); *B29K 2023/065* (2013.01); *B29K 2023/0666* (2013.01); *B29K 2023/0675* (2013.01); *B29K 2995/0037* (2013.01); *B29K 2995/0063* (2013.01); *B29K 2995/0077* (2013.01); *B29K 2995/0088* (2013.01); *C08F 2800/10* (2013.01); *C08J 2323/08* (2013.01)

(56) References Cited

U.S. PATENT DOCUMENTS

| | | |
|---|---|---|
| 5,962,598 A | 10/1999 | Mack et al. |
| 5,998,558 A | 12/1999 | Wasserman et al. |
| 6,989,423 B2 | 1/2006 | Wagner et al. |
| 11,161,924 B2 | 11/2021 | Liu et al. |
| 2004/0236041 A1 | 11/2004 | Higuchi et al. |
| 2005/0012235 A1 | 1/2005 | Schregenberger et al. |
| 2006/0038315 A1 | 2/2006 | Tunnell et al. |
| 2008/0097054 A1* | 4/2008 | Amos ............ C08F 210/16 526/135 |
| 2011/0178262 A1 | 7/2011 | Neubauer et al. |
| 2014/0148535 A1* | 5/2014 | Kapur ............ C08L 23/06 524/99 |

OTHER PUBLICATIONS

Williams, "The Construction of a Polyethylene Calibration Curve for Gel Permeation Chromotography Using Polystyrene Fractions," 1968, vol. 6, p. 621-624.

PCT/US2020/057280, International Search Report and Written Opinion with a mailing date of Nov. 11, 2020.

PCT/US2020/057280, International Preliminary Report on Patentability with a mailing date of May 3, 2022.

* cited by examiner

FIG. 1
PRIOR ART

FIG. 2
(comparative method)

FIG. 3
(inventive method (PASS))

METHOD OF INCREASING BUBBLE STABILITY OF A POLYETHYLENE RESIN

FIELD

Polyethylene polymers and related methods and articles.

INTRODUCTION

Patent application publications and patents in or about the field include U.S. Pat. Nos. 5,739,266; 5,962,598; 5,998,558; US 2004/0236041 A1; US 2005/0012235 A1; US 2006/0038315 A1; and US 2011/0178262 A1.

Thin films may be used in various applications such as packaging and medical.

Almost all polyethylene films are fabricated as either a cast film or a blown film. The cast film is made by a film casting process on a film casting machine and the blown film is made by a film blowing process on a film blowing machine.

The film blowing machine typically has an extruder configured with a circular die for annularly extruding a film, the circular die also defining a center gas port for blowing an internal gas flow inside the annularly extruded film. The film blowing machine also comprises guiding devices and a set of pinch rollers and the film blowing process performs the annular extrusion vertically upward through the guiding devices into the set of pinch rollers.

Generally, the film blowing process comprises melting a polyethylene resin in the extruder, annularly extruding the melt of a polyethylene through the circular die, followed by expanding the annularly extruded polyethylene with the internal gas flow (e.g., air) that is blown through the center port thereinto, then cooling the resulting blown bubble, and collapsing the cooled bubble to give the blown film. The pinch rollers collapse the bubble so that it is then wound onto a roller. The wound film can then be split, gusseted, and/or surface treated in a downstream line operation.

A polyethylene polymer resin can used in a melt-blowing film extrusion process to make a thin film if the resin possesses bubble stability, also known as downgauging capability. Bubble stability herein means the melt can be blown up until its thickness decreases to less than or equal to 10 micrometers ($\mu m$) without experiencing any blown film bubble instabilities. These instabilities may comprise one or more of draw resonance (a fluctuating bubble diameter also known as hour-glassing), helical instability (a wobbly bubble also known as "Mae Westing", "snaking" or Hula Hooping), slow or fast bubble breathing (expansion of blown film is lagging or exceeding desired expansion rate), sagging (a settling bubble, also known as heavy bubble or sleeping bubble), tearing (resin stops stretching, and tears away from die lip, also known as snap off), blow holing (random holes in film), and fluttering (shaking or trembling below frost line, wherein frost line is the height above the circular die where the polyethylene melt solidifies).

Neubauer et al. (US 2011/0178262 A1) control bubble stability of high molecular weight bimodal high-density polyethylene resins by oxygen tailoring a melt of the resin to change its relaxation spectrum index (RSI) value. Neubauer's method is more sensitive than controlling bubble stability using melt elasticity (the ratio of melt storage modulus (G') to loss modulus (G") measured at a dynamic frequency equal to 0.1 (G'/G" at 0.1 radian per second (rad/s)). Sometimes large changes in RSI values may be needed to achieve a target bubble stability. For example, Neubaurer's Inventive Example 1 required an increase of initial RSI value by at least about 140% for the resin to reach a regime having "excellent" bubble stability (see FIG. 2 of Neubauer, copied herein as FIG. 1).

SUMMARY

We found that high molecular weight bimodal high-density polyethylene (HDPE) resins, as obtained from a polymerization reactor ("virgin resins"), usually do not possess bubble stability. To increase bubble stability, a melt of the resin may be oxygen tailored, e.g., contacted with $O_2$ before the resin is annularly extruded in the film blowing process. This oxygen tailoring may be performed in the extruder of the film blowing machine.

We found that too little oxygen tailoring will result in bubble instability at thin film gauges (e.g., ≤10 $\mu m$) during fabrication of blown films. This blown film bubble instability may comprise any one or more of the aforementioned draw resonance(s), helical instability, slow or fast bubble breathing, sagging, tearing, blow holing (rupturing), and fluttering.

Too much oxygen tailoring will result in poor blown film impact and poor tear performance as measured by dart drop impact and Elmendorf tear methods, respectively. Such poor mechanical performance may comprise a combination of any one or more of a dart drop impact of 250 grams (g) or less (e.g., less than 225 g or less than 200 g), an Elmendorf tear in machine direction (MD) of 20 g or less (e.g., <19 g), and an Elmendorf tear in cross direction (CD) of 30 g or less (e.g., <29 g).

We recognized that prior methods of controlling oxygen tailoring of a high molecular weight bimodal HDPE resin in order to increase its bubble stability are not always sensitive enough when the composition of the resin, and hence its properties, have changed. Compositions and properties of a high molecular weight bimodal HDPE resin are changed when the resin is being made in a polymerization reactor, such as a gas-phase polymerization reactor, that is experiencing fluctuating reactor conditions. Fluctuating reactor conditions include reactor swings, changes to residence times of polymer in the reactor, transitions between different resin grades being made in the reactor, and combinations thereof. Reactor swings include oscillation or fluctuation of the following: bed temperature, catalyst feed rate, catalyst activity, catalyst composition (e.g., transitioning between different catalysts), ethylene or comonomer feed rate, or molecular hydrogen feed rate, or a combination thereof. Transitions between different resin grades include transitioning between comonomers (e.g., from making a poly(ethylene-co-1-butene) copolymer to making a poly(ethylene-co-1-hexene) copolymer, or vice versa) and using the same comonomer but making resins with different densities, molecular weights, or melt indexes or different comonomer contents or distributions.

We discovered that bubble stability (said differently, bubble instability) of certain high molecular weight bimodal HDPE resins is sensitive to a combination of the resin's melt storage modulus G' (at G"=3000 pascals) and complex viscosity ratio SH1000. We found that resins having insufficient values of both of these advanced rheological properties also have unsatisfactory bubble stability. We discovered a method of improving such resin's melt storage modulus G' (at G"=3000 pascals) and complex viscosity ratio SH1000 so as to increase its bubble stability to a satisfactory or excellent level.

We discovered a method of increasing bubble stability of a high molecular weight bimodal high-density polyethylene resin in need thereof ("needful bimodal HDPE resin"). The properties of the needful bimodal HDPE resin are different than those of a prior resin made in the same reactor due to change in reactor conditions, and thus oxygen tailoring conditions used to increase bubble stability of the prior resin may not be effective for increasing bubble stability of the needful bimodal HDPE resin. That is, the prior oxygen tailoring conditions may give too little oxygen tailoring or too much oxygen tailoring of the needful bimodal HDPE resin. Thus, a sensitive method of determining oxygen tailoring conditions for the needful bimodal HDPE resin is needed. The present method is sensitive enough. The method comprises subjecting the needful bimodal HDPE resin to a determined amount of oxygen tailoring of the resin based on the resin's melt storage modulus G' (at G"=3000 pascals) and complex viscosity ratio SH1000, and thereby make an oxygen-tailored high molecular weight bimodal high-density polyethylene resin having a targeted increase in bubble stability. The method uses a tailoring effective amount of molecular oxygen ($O_2$) to achieve the desired oxygen tailoring. The method uses these advanced rheological properties from dynamic mechanical spectroscopy (DMS), but analyzes the data in a different way that is more sensitive to changes in resin composition and properties, and yet achieves a HDPE resin regime having a targeted increase in bubble stability.

DETAILED DESCRIPTION

A method of increasing bubble stability of a high molecular weight bimodal high-density polyethylene resin in need thereof ("needful bimodal HDPE resin"). The properties of the needful bimodal HDPE resin are different than those of a prior resin made in the same reactor due to change in reactor conditions, and thus oxygen tailoring conditions used to increase bubble stability of the prior resin may not be effective for increasing bubble stability of the needful bimodal HDPE resin. That is, the prior oxygen tailoring conditions may give too little oxygen tailoring or too much oxygen tailoring of the needful bimodal HDPE resin. Thus, a sensitive method of determining oxygen tailoring conditions for the needful bimodal HDPE resin is needed. The present method is sensitive enough. The method comprises subjecting the needful bimodal HDPE resin to a determined amount of oxygen tailoring of the resin based on the resin's melt storage modulus G' (at G"=3000 pascals) and complex viscosity ratio SH1000, and thereby make an oxygen-tailored high molecular weight bimodal high-density polyethylene resin having a targeted increase in bubble stability. The method uses a tailoring effective amount of molecular oxygen ($O_2$) to achieve the desired oxygen tailoring. The method uses these advanced rheological properties from dynamic mechanical spectroscopy (DMS), but analyzes the data in a different way that is more sensitive to changes in resin composition and properties, and yet achieves an HDPE resin regime having a targeted increase in bubble stability.

Additional inventive aspects follow; some are numbered for easy cross-referencing.

Aspect 1. A method of increasing bubble stability of a needful bimodal high-density polyethylene (HDPE) resin that comprises a higher molecular weight (HMW) polyethylene polymer constituent and a lower molecular weight (LMW) polyethylene polymer constituent and has an overall density from 0.935 to 0.970 gram per cubic centimeter (g/cm$^3$) and an overall weight-average molecular weight ($M_w$) from 200,000 to 450,000 grams per mole (g/mol), which needful bimodal HDPE resin is in need of increased bubble stability because the properties of the needful bimodal HDPE resin are different than those of a prior resin made in the same reactor due to change in reactor conditions and the needful bimodal HDPE resin has a first melt storage modulus G' (at loss modulus G"=3000 pascals) of less than 1501 pascals (e.g., from 1,000.0 to 1500.0 pascals) and a first complex viscosity ratio (shear thinning) SH1000 of from 33.0 to 49.0, the method comprising: contacting under oxygen-tailoring conditions a melt of the needful bimodal HDPE resin with an oxygen-tailoring mixture consisting essentially of a tailoring effective amount of molecular oxygen gas ($O_2$) and one or more inert gases, and wherein during the contacting the melt is at a temperature from 235° to 251° C., so as to make an oxygen-tailored bimodal HDPE resin having a second melt storage modulus G' (at G"=3000 pascals) of from 1565 to 1900 pascals and a second complex viscosity ratio SH1000 of from 38.0 to 50.0; wherein density is measured according to ASTM D792-13, Method B; wherein $M_w$ is measured according to the Gel Permeation Chromatography (GPC) Test Method; wherein each melt storage modulus G' (at G"=3000 pascals) is measured according to the Melt Storage Modulus Test Method; and wherein each complex viscosity ratio SH1000 is equal to Eta*0.10/Eta*100, wherein Eta*0.10 is complex viscosity in pascal-seconds (Pa-s) measured at 0.10 radian per second (rad/s) and wherein Eta*100 is complex viscosity in Pa-s measured at 100 rad/s, both measured according to Dynamic Mechanical Analysis Test Method. In aspect 1 the determined amount of oxygen tailoring of the needful bimodal HDPE resin is based on the resin's molecular weight spread.

Aspect 2. The method of aspect 1 wherein the tailoring effective amount of the $O_2$ gas in the contacting step is as described by any one of limitations (i) to (ii): (i) an $O_2$ gas concentration of X volume percent (vol %) of the oxygen-tailoring mixture; and (ii) an amount of the $O_2$ gas is Y weight parts per 1 million weight parts of the needful bimodal HDPE resin (ppmw).

Aspect 3. The method of aspect 1 or 2 wherein the oxygen-tailoring mixture has an $O_2$ gas concentration of X volume percent (vol %), and wherein the oxygen-tailoring conditions comprise any one of limitations (i) to (iv):(i) the melt is at a temperature from 235° to 245° C.; (ii) the melt is at a temperature from 236° and 241° C.; (ii) the one or more inert gases of the oxygen-tailoring mixture is molecular nitrogen ($N_2$), argon, helium, $CO_2$, one or more alkane(s), or a combination of any two or more thereof; and (iv) both (iii) and any one of (i) and (ii).

Aspect 4. The method of any one of aspects 1 to 3 wherein the oxygen-tailored bimodal HDPE resin has any one of limitations (i) to (iii): (i) the second melt storage modulus G'

(at G"=3000) is from 1565 to 1800 pascals; (ii) the second complex viscosity ratio SH1000 is from 40 to 49.4; (iii) both (i) and (ii).

Aspect 5. The method of any one of aspects 1 to 4 wherein the oxygen-tailored bimodal HDPE resin passes a MLS350 bubble stability test determined according to the Bubble Stability Test Method.

Aspect 6. The method of any one of aspects 1 to 5 wherein the needful bimodal HDPE resin has any one of limitations (i) to (vi): (i) the overall density is from 0.940 to 0.960 g/cm$^3$; (ii) the overall $M_w$ is from 250,000 to 400,000 g/mol; (iii) the first melt storage modulus G' (at G"=3000 pascals) is from 1001 to 1300 pascals; (iv) the first complex viscosity ratio SH1000 is from 35.0 to 48.0; (v) an overall high-load melt index (HLMI or $I_{21.6}$) of from 8.0 to 10.0 grams per 10 minutes (g/10 min.); and (vi) an overall melt flow ratio-5 (MFR5 or $I_{21.6}/I_{5.0}$) from 25 to 45, alternatively from 30.1 to 39.4, alternatively from 31.0 to 36.0; wherein the $I_{21.6}$ is measured according to ASTM D1238-13, using conditions of 190° C./21.6 kilograms (kg); and wherein the $I_{5.0}$ is measured according to ASTM D1238-13, using conditions of 190° C./5.0 kg.

Aspect 7. The method of any one of aspects 1 to 6 further comprising preliminary steps (A) and (B) before the contacting step: (A) determining a molecular weight spread of the needful bimodal HDPE resin, wherein the molecular weight spread is (a1) a ratio of weight-average molecular weight of the HMW polyethylene polymer constituent to weight-average molecular weight of the LMW polyethylene polymer constituent ($M_{w\text{-}HMW}/M_{w\text{-}LMW}$); (B) determining the tailoring effective amount of molecular oxygen gas ($O_2$) that is effective in the contacting step as a function of the determined molecular weight spread of the needful bimodal HDPE resin.

Aspect 8. The method of aspect 7 wherein the needful bimodal HDPE resin has any one of limitations (i) to (iii): (i) the molecular weight spread is (a1) the ratio $M_{w\text{-}HMW}/M_{w\text{-}LMW}$, wherein $M_{w\text{-}HMW}/M_{w\text{-}LMW}$ is from 23 to 45; (ii) the molecular weight spread is (a2) a ratio of number-average molecular weight of the HMW polyethylene polymer constituent to number-average molecular weight of the LMW polyethylene polymer constituent ($M_n\text{-}HMW/M_{n\text{-}LMW}$), wherein $M_{n\text{-}HMW}/M_{n\text{-}LMW}$ is from 18 to 30; (iii) the molecular weight spread is (a3) a ratio of z-average molecular weight of the HMW polyethylene polymer constituent to z-average molecular weight of the LMW polyethylene polymer constituent ($M_z\text{-}HMW/M_{z\text{-}LMW}$), wherein $M_{z\text{-}HMW}/M_{z\text{-}LMW}$ is from 18 to 45; wherein $M_w$, $M_n$, and $M_z$ are measured according to the Gel Permeation Chromatography (GPC) Test Method.

Aspect 9. An oxygen-tailored bimodal HDPE resin made by the method of any one of aspects 1 to 8. The oxygen-tailored bimodal HDPE resin has the second melt storage modulus G' (at G"=3000) and the second complex viscosity ratio SH1000 described herein.

Aspect 10. A blown film comprising the oxygen-tailored bimodal HDPE resin of aspect 9. The blown film passes the MLS350 bubble stability test.

Aspect 11. A method of determining whether a bimodal high-density polyethylene (HDPE) resin that comprises a higher molecular weight (HMW) polyethylene polymer constituent and a lower molecular weight (LMW) polyethylene polymer constituent and has an overall density from 0.935 to 0.970 gram per cubic centimeter (g/cm$^3$) and an overall weight-average molecular weight ($M_w$) from 200,000 to 450,000 grams per mole (g/mol), is in need of increased bubble stability, the method comprising measuring melt storage modulus G' (at loss modulus G"=3000 pascals) and complex viscosity ratio (shear thinning) SH1000 of the needful bimodal HDPE resin, and determining the bimodal HDPE is a need of increased bubble stability if the melt storage modulus G' (at loss modulus G"=3000 pascals) is less than 1501 pascals (e.g., from 1,000.0 to 1500.0 pascals) and the complex viscosity ratio (shear thinning) SH1000 is from 33.0 to 49.0. In some aspects the method further comprises a preliminary step before the measuring step of determining whether the bimodal HDPE is compositionally-changed from an immediately prior resin made in a same gas-phase polymerization reactor.

The needful bimodal HDPE resin comprises a higher molecular weight (HMW) polyethylene constituent and a lower molecular weight (LMW) polyethylene constituent. The needful bimodal HDPE resin may have an overall density from 0.935 to 0.970 gram per cubic centimeter (g/cm$^3$) and an overall weight-average molecular weight ($M_w$) from 200,000 to 450,000 grams per mole (g/mol). The needful bimodal HDPE resin may have a melt storage modulus G' (at loss modulus G"=3000 pascals) of less than 1501 pascals (e.g., from 1,000.0 to 1500.0 pascals) and a complex viscosity ratio (shear thinning) SH1000 of from 33.0 to 49.0. The G' (at loss modulus G"=3000 pascals) and SH1000 of the needful bimodal HDPE resin are both too low for adequate bubble stability.

The needful bimodal HDPE resin may be "compositionally-changed" from an immediately prior resin made in a same gas-phase polymerization reactor. The expression "compositionally-changed" means a difference of at least 1 percent (%), alternatively from 1% to 10%, alternatively from 1% to 5%, alternatively from 5% to 10% in any one, two, or more of the following resin properties: density, weight-average molecular weight ($M_w$), Log($M_w$) of the LMW polyethylene constituent, Log($M_w$) of the HMW polyethylene constituent, amount of the HMW polyethylene constituent based on total weight of the HMW and LMW polyethylene constituents, high-load melt index ($I_{21.6}$), melt flow ratio-5 ($I_{21.6}/I_{5.0}$), wherein density is measured according to ASTM D792-13, Method B; wherein $M_w$ is measured according to the Gel Permeation Chromatography (GPC) Test Method; wherein the $I_{21.6}$ is measured according to ASTM D1238-13, using conditions of 190° C./21.6 kilograms (kg); and wherein the $I_{5.0}$ is measured according to ASTM D1238-13, using conditions of 190° C./5.0 kg.

To increase bubble stability, a melt of the needful bimodal HDPE resin is subjected to oxygen tailoring using a tailoring effective amount of molecular oxygen ($O_2$). We found that the combination of G' (at loss modulus G"=3000 pascals) and SH1000 properties are more sensitive to determining the tailoring effective amount of $O_2$ than RSI value or melt elasticity (G'/G" at 0.1 rad/s).

The expression "tailoring effective amount" means any quantity of molecular oxygen ($O_2$) that is sufficient under oxygen tailoring conditions to transform a needful bimodal high-density polyethylene (needful bimodal HDPE) polymer (e.g., the needful bimodal high-density polyethylene (HDPE) resin) that comprises a higher molecular weight (HMW) polyethylene polymer constituent and a lower molecular weight (LMW) polyethylene polymer constituent and has a melt storage modulus G' (at loss modulus G"=3000 pascals) of less than 1501 pascals (e.g., from 1,000.0 to 1500.0 pascals) and a complex viscosity ratio (shear thinning) SH1000 of less than 49.5 (e.g., from 33.0 to 49.0) into an oxygen-tailored bimodal HDPE polymer that has increased bubble stability by virtue of having a higher melt storage modulus G' (at G"=3000 pascals) (e.g., from 1565 to 1900 pascals) and a higher complex viscosity ratio SH1000 (e.g., from 38.0 to 50.0).

The method may further comprise a preliminary step (before the oxygen tailoring step) of adjusting or calibrating the tailoring effective amount to achieve a targeted or desired amount of increase of bubble stability under a set of particular circumstances. The adjusting or calibrating may be based on any one or more of the following particular circumstances: (a) the particular oxygen tailoring conditions (e.g., temperature of the needful bimodal HDPE polymer, concentration of $O_2$ in the oxygen tailoring mixture, and/or flow rate of the oxygen tailoring mixture to the needful bimodal HDPE polymer), (b) the quantity of needful bimodal HDPE polymer being oxygen tailored, (c) the particular values of melt storage modulus G' (at loss modulus G"=3000 pascals) and complex viscosity ratio (shear thinning) SH1000 of the needful bimodal HDPE polymer being oxygen tailored, (d) the molecular weight spread between the HMW polyethylene constituent and the LMW polyethylene constituent of the needful bimodal HDPE polymer, (e) the residence time of the needful bimodal HDPE polymer during making thereof in a gas phase polymerization reactor under a known set of gas phase polymerization conditions, and (f) the particular configuration (size and shape) of the container (e.g., a melt mixer or extruder device) in which the oxygen tailoring is being performed. The resulting adjusted or calibrated tailoring effective amount may be expressed as a volume percent $O_2$ in the oxygen tailoring mixture, or as a number of weight parts per million (ppmw) of $O_2$ relative to 1,000,000 weight parts of the needful bimodal HDPE polymer, to be used under the particular circumstances.

In some aspects the adjusting or calibrating is based on the molecular weight spread between the HMW polyethylene constituent and the LMW polyethylene constituent. The expression "molecular weight spread" of the needful bimodal HDPE resin is a ratio of weight-average molecular weight of the HMW polyethylene polymer constituent to weight-average molecular weight of the LMW polyethylene polymer constituent ($M_{w\text{-}HMW}/M_{w\text{-}LMW}$). This aspect of the adjusting or calibrating may comprise determining the molecular weight spread of the bimodal HDPE polymer in need of increased bubble stability, wherein the molecular weight spread is a ratio of weight-average molecular weight of the HMW polyethylene polymer constituent to weight-average molecular weight of the LMW polyethylene polymer constituent ($M_{w\text{-}HMW}/M_{w\text{-}LMW}$); and determining the tailoring effective amount of $O_2$ in an oxygen-tailoring mixture consisting essentially of the tailoring effective amount of $O_2$ and one or more inert gases, wherein the tailoring effective amount of $O_2$ is sufficient to make the oxygen-tailored bimodal HDPE resin having increased (and satisfactory) bubble stability. For example, the tailoring effective amount of $O_2$ gas may be determined as a volume percent, X, of the $O_2$ gas in the oxygen-tailoring mixture based on 100 volume percent of the oxygen-tailoring mixture, and the total amount of oxygen-tailoring mixture to be used, wherein the total concentration of the one or more inert gases equals 100−X, wherein X is determined from the molecular weight spread according to the following mathematical equation (1): X volume percent=0.235*($M_{w\text{-}HMW}/M_{w\text{-}LMW}$)+(0.041*W)−64.9 volume percent (Eq. 1), wherein each * indicates multiplication, + indicates addition, − indicates subtraction, and W is a target value for the second melt storage modulus G' (at G"=3000 pascals) to be achieved in the oxygen tailoring step, wherein the target value W is from 1565 to 1900 pascals.

The foregoing equation (1) may be adapted for use with different oxygen tailoring equipment/scale of operations. For example, the calibrating may be further adjusted for use with different equipment setup according to equation (1a): A*X volume percent=0.235*(Mw-HMW/Mw-LMW)+(0.041*W)−64.9 (Eq. 1a), wherein X, W, +, −, and * are as defined above for Eq. 1, and A is an equipment calibration factor. All other things being equal, as the size of the equipment or amount of resin increases the value for equipment calibration factor A increases.

In some embodiments the effective amount of the $O_2$ gas used in the contacting step may be described by any one of limitations (i) to (iii): (i) the oxygen-tailoring mixture has an $O_2$ gas concentration of X volume percent (vol %), wherein X is from 5 to 12 vol % of the oxygen-tailoring mixture and wherein the total concentration of the one or more inert gases is from 95 to 88 vol %, respectively, of the oxygen-tailoring mixture; (ii) the amount of the $O_2$ gas used in the oxygen tailoring step is Y weight parts per 1 million weight parts of the compositionally-changed bimodal HDPE resin (ppmw), wherein Y is from 20 to 200 ppmw; and (iii) both (i) and (ii). In some aspects the contacting step is described by limitation (i), which may be used when the contacting step is performed in a vessel (e.g., an extruder) that is incompletely sealed against incursion of external atmosphere (e.g., air) into the vessel or leaks of vessel atmosphere (e.g., $N_2$) out of the vessel such that knowing the volume percent of $O_2$ gas being added into the vessel makes for more sensitive control of the oxygen tailoring step. In other aspects the contacting step is described by limitation (ii), which may be used when the contacting step is performed in a vessel (e.g., an extruder) that is substantially sealed such that knowing the ppmw of $O_2$ gas being added into the vessel relative to the weight of the compositionally-changed bimodal HDPE resin being oxygen tailored makes for more sensitive control of the oxygen tailoring step.

In some embodiments the oxygen-tailoring mixture may have an $O_2$ gas concentration of X volume percent (vol %), and the oxygen-tailoring conditions may comprise any one of limitations (i) to (vi): (i) the effective concentration, X, of $O_2$ gas is from 6 to 11 vol % of the oxygen-tailoring mixture and the total concentration of the one or more inert gases is from 94 to 89 vol %, respectively, of the oxygen-tailoring mixture; (ii) the effective concentration, X, of $O_2$ gas is from 6.5 to 10.4 vol % of the oxygen-tailoring mixture and the total concentration of the one or more inert gases is from 93.5 to 89.6 vol %, respectively, of the oxygen-tailoring mixture; (iii) the effective concentration, X, of $O_2$ gas is from 9.0 to 11.0 vol % of the oxygen-tailoring mixture and the total concentration of the one or more inert gases is from 91.0 to 89.0 vol %, respectively, of the oxygen-tailoring mixture; (iv) the melt is at a temperature from 235° to 245° C.; (v) the melt is at a temperature from 236° and 241° C. (e.g., from 239° to 241° C.); (vi) the one or more inert gases of the oxygen-tailoring mixture is molecular nitrogen ($N_2$), argon, helium, $CO_2$, one or more alkane(s), or a combination of any two or more thereof. In some aspects the oxygen tailoring conditions comprise a combination of any two or more of the foregoing limitations according to any one of (vii) to (x): (vii) both (iv) and any one of (i) to (iii); (viii) both (v) and any one of (i) to (iii); (ix) both (vi) and any one of (i) to (iii); and (x) any one of (iv) and (v), and (vi), and any one of (i) to (iii).

The method may comprise an amount of oxygen tailoring of the needful bimodal HDPE resin based on the resin's molecular weight spread so as to independently increase both the resin's melt storage modulus G' (at G"=3000 pascals) and complex viscosity ratio SH1000, and thereby achieve a targeted increase in bubble stability of the needful bimodal HDPE resin. Each increase in melt storage modulus G' (at G"=3000 pascals) may be no more than 50%, alternatively 46%; and each increase in complex viscosity ratio SH1000 may be no more than 18%, alternatively no more than 14.9%.

A person of ordinary skill in the oxygen tailoring art may readily adjust or calibrate the tailoring effective amount in order to achieve a desired or targeted increased bubble stability and/or desired or targeted melt storage modulus G' (at loss modulus G"=3000 pascals) and complex viscosity ratio (shear thinning) SH1000 of the needful bimodal HDPE polymer under the particular circumstances. For example, a sub-optimal tailoring effective amount may be used initially in the oxygen tailoring step, and thereafter the tailoring effective amount may be steadily increased (e.g., continuously or step-wise) until a desired effect on the melt storage modulus G' (at loss modulus G"=3000 pascals) and complex viscosity ratio (shear thinning) SH1000 of the needful bimodal HDPE polymer is achieved under the particular circumstances.

In any one of the above aspects, the oxygen-tailored bimodal HDPE resin may have any one of limitations (i) to (iii): (i) a second melt storage modulus G' (at G"=3000 pascals) of from 1585 to 1730 pascals, alternatively from 1620 to 1700 pascals; (ii) a second complex viscosity ratio SH1000 of from 44.0 to 50.0, alternatively from 46.0 to 49.0.

The melt storage modulus G' (at G"=3000 pascals), the complex viscosity ratio SH1000, and the melt elasticity (G'/G" at 0.1 rad/s) referred to herein are measured on the overall bimodal HDPE resin, not the HMW polyethylene polymer constituent or the LMW polyethylene polymer constituent. This is indicated in the data tables shown later by "overall".

As used herein oxygen tailoring refers to a process of contacting the needful bimodal HDPE resin, typically in melted form, with molecular oxygen gas ($O_2$). Although an embodiment of the method may contact the melt of the resin with neat $O_2$ gas (100 volume percent $O_2$), typically for safety reasons an embodiment of the method contacts the needful bimodal HDPE resin with the oxygen tailoring mixture consisting essentially of the $O_2$ gas and one or more of inert gases. The contacting step may be performed simultaneously with a thermomechanical treating of the needful bimodal HDPE resin in an extruder to give the oxygen-tailored bimodal HDPE resin that is also thermomechanically treated. Alternatively, the contacting step may be performed before the thermomechanical treating step to give the oxygen-tailored bimodal HDPE resin, and then the oxygen-tailored bimodal HDPE resin may be thermomechanically treated in an extruder to give the oxygen-tailored bimodal HDPE resin that is also thermomechanically treated. The thermomechanical treating step may be used to incorporate one or more additives into the needful bimodal HDPE resin and/or the oxygen-tailored bimodal HDPE resin.

The extruder may be any extruder; for example, the extruder may be a single screw extruder or a multiple screw extruder such as twin screw extruder or continuous mixer. Such extruders are generally known to a person skilled in the art. The extruder may provide a specific mechanical energy in the range of from 0.10 to 0.50 kilowatt hour (kWh) per kilogram of the polyethylene resin, alternatively from 0.10 to 0.24 kWh per kilogram, alternatively from 0.12 to 0.30 kWh per kilogram, alternatively from 0.14 to 0.40 kWh per kilogram, alternatively from 0.16 to 0.50 kWh per kilogram.

The contacting step (the oxygen tailoring step) may be performed until the second melt storage modulus G' (at G"=3000) is at least 10% greater, alternatively from 15% to 50% greater, alternatively from 25% to 46% greater, alternatively from 33% to 44% greater than the first melt storage modulus G' (at G"=3000); or until the second complex viscosity ratio SH1000 is at least 4% greater, alternatively from 5% to 18% greater, alternatively from 10% to 14.9% greater, alternatively from 11.0% to 14.5% greater than the first complex viscosity ratio SH1000; or both.

The oxygen-tailored bimodal HDPE resin, with or without additives, may be pelletized by feeding the melt of the oxygen-tailored bimodal HDPE resin from the extruder into a pelleter such as an underwater pelleter. The pelletizing step may be used to make the oxygen-tailored bimodal HDPE resin in the form of pellets.

The oxygen-tailored bimodal HDPE resin may be an oxygen-tailored bimodal poly(ethylene-1-alkene) copolymer that comprises an oxygen-tailored higher molecular weight (HMW) poly(ethylene-1-alkene) copolymer constituent and an oxygen-tailored lower molecular weight (LMW) poly(ethylene-1-alkene) copolymer constituent and has an overall density from 0.935 to 0.970 g/cm$^3$, alternatively from 0.940 to 0.960 g/cm$^3$, alternatively from 0.945 to 0.955 g/cm$^3$, alternatively from 0.948 to 0.951 g/cm$^3$. The oxygen-tailored bimodal poly(ethylene-1-alkene) copolymer may be an oxygen-tailored bimodal poly(ethylene-1-butene) copolymer or alternatively an oxygen-tailored bimodal poly(ethylene-1-hexene) copolymer, alternatively the oxygen-tailored bimodal poly(ethylene-1-butene) copolymer. The oxygen-tailored LMW poly(ethylene-1-alkene) copolymer constituent may have a $M_w$ from 13,000 to 32,000 g/mol. The oxygen-tailored HMW poly(ethylene-1-butene) copolymer constituent having a $M_w$ from 450,000 to 750,000 g/mol.

The oxygen-tailored bimodal HDPE resin may be free of any post-reactor added additives. The oxygen-tailored bimodal HDPE resin may contain one or more additives used during the making of the needful bimodal HDPE resin in the polymerization reactor. For example, embodiments of the oxygen-tailored bimodal HDPE resin may optionally contain a deactivated polymerization catalyst, a chain transfer agent, a static control agent, or a continuity additive. The chain transfer agents are well known and may be alkyl metal such as diethyl zinc. A static control agent or continuity additive may be aluminum stearate or polyethyleneimine.

Optionally, in a post-oxygen tailoring process, the oxygen-tailored bimodal HDPE resin may be melted (e.g., in an extruder) and combined with 0, 1 or more additives such as the acid neutralizer (e.g., hydrotalcite or a metal deactivator), at least one antioxidant, a polyethylene polymer that is different in composition than the oxygen-tailored bimodal HDPE resin, a polypropylene polymer, a slip agent (e.g., erucamide, stearamide, or behenamide), a stabilizer for stabilizing the oxygen-tailored resin against the effects of ultraviolet (UV) light (e.g., a hindered amine stabilizer (HAS) such as a hindered amine light stabilizer (HALS), and a flame retardant. The oxygen-tailored bimodal HDPE resin may also contain a nucleating agent such as a calcium or magnesium salt of 1,2-cyclohexanedicarboxylate.

The needful bimodal HDPE resin may be a bimodal poly(ethylene-1-alkene) copolymer that comprises a higher molecular weight (HMW) poly(ethylene-1-alkene) copolymer constituent and a lower molecular weight (LMW)

poly(ethylene-1-alkene) copolymer constituent and has an overall density from 0.935 to 0.970 g/cm$^3$, alternatively from 0.940 to 0.960 g/cm$^3$, alternatively from 0.945 to 0.955 g/cm$^3$, alternatively from 0.948 to 0.951 g/cm$^3$. The bimodal poly(ethylene-1-alkene) copolymer may be a bimodal poly(ethylene-1-butene) copolymer or alternatively a bimodal poly(ethylene-1-hexene) copolymer, alternatively a bimodal poly(ethylene-1-butene) copolymer. The LMW poly(ethylene-1-alkene) copolymer constituent may have a $M_w$ from 13,000 to 32,000 g/mol. The HMW poly(ethylene-1-butene) copolymer constituent having a $M_w$ from 450,000 to 750,000 g/mol.

The needful bimodal HDPE resin used in the contacting step may be a virgin bimodal HDPE resin as obtained from a polymerization reactor. That is the virgin bimodal HDPE resin may be free of any post-reactor added additives. The virgin bimodal HDPE resin may contain one or more additives used during the making thereof in the polymerization reactor. For example, embodiments of the virgin bimodal HDPE resin that are made in a gas-phase polymerization reactor, such as a floating-bed gas-phase polymerization reactor, may optionally contain a deactivated polymerization catalyst, a chain transfer agent, a static control agent, or a continuity additive. The chain transfer agents are well known and may be alkyl metal such as diethyl zinc. A static control agent or continuity additive may be aluminum stearate or polyethyleneimine.

The virgin bimodal HDPE resin may be made by contacting ethylene and a 1-alkene in a floating-bed gas-phase polymerization reactor having a bed temperature of from 90° to 100° C., and receiving a feed of ethylene ($C_2$), 1-alkene ($C_x$), and molecular hydrogen gas ($H_2$) and an induced condensing agent isopentane. In the reactor the molar ratio of 1-alkene to ethylene ($C_x/C_2$ molar ratio) may be from 0.003 to 0.03. In some aspects the $C_x/C_2$ molar ratio may be slightly different for different 1-alkenes. For example, if the 1-alkene is 1-hexene, the $C_x/C_2$ molar ratio ($C_6/C_2$ molar ratio) may be from 0.003 to 0.015. If the 1-alkene is 1-butene, the $C_x/C_2$ molar ratio ($C_4/C_2$ molar ratio) may be from 0.006 to 0.030, alternatively from 0.010 to 0.020, alternatively from 0.011 to 0.015, e.g., 0.013 or 0.012. In the reactor the molar ratio of molecular hydrogen gas to ethylene ($H_2/C_2$ molar ratio) may be from 0.001 to 0.01, alternatively 0.0020 to 0.0050, alternatively from 0.0044 to 0.0021, e.g., 0.0040, 0.0034, or 0.0025. The residence time for the copolymer in the reactor may be from 2 to 5 hours, alternatively from 3 to 4.4 hours, alternatively from 3.4 to 4.1 hours, e.g., 3.6 hours, 3.8 hours, 3.9 hours, or 4.0 hours. The isopentane may be 5 to 15 mole percent (mol %) based on total gases in the reactor.

Optionally, in a post-reactor process, the virgin needful bimodal HDPE resin may be melted (e.g., in an extruder) and combined with 0, 1 or more additives such as the acid neutralizer (e.g., hydrotalcite or a metal deactivator), at least one antioxidant, a polyethylene polymer that is different in composition than the needful bimodal HDPE resin, a polypropylene polymer, a slip agent (e.g., erucamide, stearamide, or behenamide), a stabilizer for stabilizing the resin against the effects of ultraviolet (UV) light (e.g., a hindered amine stabilizer (HAS) such as a hindered amine light stabilizer (HALS), and a flame retardant. The needful bimodal HDPE resin may also contain a nucleating agent such as a calcium or magnesium salt of 1,2-cyclohexanedicarboxylate.

Film. A manufactured article that is restricted in one dimension.

High density. As applied to a polyethylene, having a density of greater than or equal to 0.935 g/cm$^3$, alternatively from 0.940 to 0.970 g/cm$^3$, measured according to ASTM D792-08 (Method B, 2-propanol). The HMW PE constituent and the LMW PE constituent independently may be a high-density polyethylene (HDPE).

Homopolymer. A polymer derived from one species of monomer. The species may be real (e.g., ethylene or a 1-alkene), implicit (e.g., as in poly(ethylene terephthalate)), or hypothetical (e.g., as in poly(vinyl alcohol)).

Internal bubble cooling or IBC is an aspect of film blowing performed by actively using ancillary, special purpose IBC equipment such as that of US 2002/0150648 A1 to R. E. Cree.

The relative terms "higher" and "lower" in HMW PE constituent and LMW PE constituent are used in reference to each other and merely mean that the weight-average molecular weight of the HMW PE constituent ($M_{w\text{-}HMW}$) is greater than the weight-average molecular weight of the LMW PE constituent ($M_{w\text{-}LMW}$), i.e., $M_{w\text{-}HMW} > M_{w\text{-}LMW}$.

Any compound, composition, formulation, mixture, or product herein may be free of any one of the chemical elements selected from the group consisting of: H, Li, Be, B, C, N, O, F, Na, Mg, Al, Si, P, S, Cl, K, Ca, Sc, Ti, V, Cr, Mn, Fe, Co, Ni, Cu, Zn, Ga, Ge, As, Se, Br, Rb, Sr, Y, Zr, Nb, Mo, Tc, Ru, Rh, Pd, Ag, Cd, In, Sn, Sb, Te, I, Cs, Ba, Hf, Ta, W, Re, Os, Ir, Pt, Au, Hg, Ti, Pb, Bi, lanthanoids, and actinoids; with the proviso that any required chemical elements (e.g., C and H required by a polyolefin; or C, H, and O required by an alcohol) are not excluded.

Alternatively precedes a distinct embodiment. Aspect means an embodiment. ASTM means the standards organization, ASTM International, West Conshohocken, Pennsylvania, USA. Any comparative example is used for illustration purposes only and shall not be prior art. Free of or lacks means a complete absence of; alternatively not detectable. ISO is International Organization for Standardization, Chemin de Blandonnet 8, CP 401-1214 Vernier, Geneva, Switzerland. Terms used herein have their IUPAC meanings unless defined otherwise. For example, see IUPAC's *Compendium of Chemical Terminology. Gold Book*, version 2.3.3, Feb. 24, 2014. IUPAC is International Union of Pure and Applied Chemistry (IUPAC Secretariat, Research Triangle Park, North Carolina, USA). May confers a permitted choice, not an imperative. Operative means functionally capable or effective. Optional(ly) means is absent (or excluded), alternatively is present (or included). Properties may be measured using standard test methods and conditions. Ranges include endpoints, subranges, and whole and/or fractional values subsumed therein, except a range of integers does not include fractional values.

For property measurements, samples are prepared into test specimens, plaques, or sheets according to ASTM D4703-10, *Standard Practice for Compression Molding Thermoplastic Materials into Test Specimens, Plaques, or Sheets.*

Bubble Stability Test Method: Pellets of a polymer resin are melted at melt temperature described later, and separately blown into films using an Alpine 50 millimeter (mm) 25:1 length to diameter (LID) dimensioned barrier single screw extruder, a 120 mm inner diameter die, a 1.2 mm die gap, without IBC (internal bubble cooling). The following properties of 12.7 micrometer (μm) thickness films were measured in ASTM laboratories according to ASTM standards: (a) bubble rating at standard output rate of 1.43 kilograms per hour-centimeter (kg/hour-cm, bubble rating STD); and (b) a bubble rating at standard output rate with maximum line speed greater than 76 or 106 meters per minute (m/min., bubble rating MLS250 or MLS350, respectively). Bubble ratings were scored on a scale from 1 to 5 as follows: 1. Film could not be made. 2. Film could be made but production of film had bubble instability. 3. Film could be made but production of film had slight bubble instability. 4. Film could be made with satisfactory bubble stability. 5. Film could be made with very stable bubble. If the bubble rating is 3, 4, or 5, the resin passes the particular bubble stability test. If the bubble rating is 1 or 2, the resin fails the particular bubble stability test. The MLS350 bubble rating is considered the most stringent bubble stability test method relative to STD and MLS250, and therefore the MLS350 bubble rating is used herein as the basis for assessing and improving the method of increasing bubble stability.

Complex Viscosity Test Method: measure complex viscosity, loss modulus, storage modulus, and phase angle via a frequency sweep from 0.1 to 100 radians per second (rad/s) at 10% strain on 25-mm diameter "puck" at 190° C. in an inert gas ($N_2$) environment using Dynamic Mechanical Spectroscopy (DMS). Control temperature using a convection oven. Prepare the puck by compression molding pellets of test sample into 2-mm thick plaques, and punch out there from a 25-mm diameter "puck". Use an ARES-G2 or ARES-2 rheometer from TA Instruments equipped with top and bottom 25-mm parallel plates having an initial gap therebetween set to about 1.8 mm. Place the puck on the bottom plate, and allow the puck to reach thermal equilibrium. Then close the gap, and trim the puck to remove excess material before measuring the complex viscosity. Obtain the values of storage modulus (G'), loss modulus (G"), complex modulus (G*) and complex viscosity ($\eta^*$) as a function of frequency ($\omega$). Obtain a SH1000 value by calculating the complex viscosities ($\eta^*$) at given values of frequency ($\omega$), and calculating the ratio of the two viscosities. For example, using the values of frequency ($\omega$) of 0.10 rad/s and 100 rad/s, obtain the SH1000=Eta*0.10/Eta*100 (i.e., $\eta^*$(0.10 rad/s)/$\eta^*$(100 rad/s) at a constant value of loss modulus G" of 3,000 pascals (Pa). The SH1000 is defined as the ratio of the two complex viscosities Eta*0.10/Eta*100 (i.e., $\eta^*$(0.10 rad/s)/$\eta^*$(100 rad/s).

Dart Drop Impact Test Method: measured according to ASTM D1709-16a, *Standard Test Methods for Impact Resistance of Plastic Film by the Free-Falling Dart Test Method*, Method A. Method A employs a dart with a 38.10±0.13-mm (1.500±0.005-in.) diameter hemispherical head dropped from a height of 0.66±0.01 m (26.0±0.4 in.). This test method can be used for films whose impact resistances require masses of about 50 g or less to about 6 kg to fracture them. Results expressed in grams (g).

Deconvoluting Test Method: Fit a GPC chromatogram of a bimodal polyethylene into a high molecular weight (HMW) component fraction and low molecular weight (LMW) component fraction using a Flory Distribution that was broadened with a normal distribution function as follows. For the log M axis, establish 501 equally-spaced Log(M) indices, spaced by 0.01, from Log(M) 2 and Log(M) 7, which range represents molecular weight from 100 to 10,000,000 grams per mole. Log is the logarithm function to the base 10. At any given Log(M), the population of the Flory distribution is in the form of the following equation:

$$dW_f = \left(\frac{2}{M_w}\right)^3 \left(\frac{M_w}{0.868588961964}\right) M^2 e^{(-2M/M_w)},$$

wherein $M_w$ is the weight-average molecular weight of the Flory distribution; M is the specific x-axis molecular weight point, (10 ^[Log(M)]); and $dW_f$ is a weight fraction distribution of the population of the Flory distribution. Broaden the Flory distribution weight fraction, $dW_f$, at each 0.01 equally-spaced log(M) index according to a normal distribution function, of width expressed in Log(M), $\sigma$; and current M index expressed as Log(M), $\mu$.

$$f_{(LogM,\mu,\sigma)} = \frac{e^{-\frac{(LogM-\mu)^2}{2\sigma^2}}}{\sigma\sqrt{2\pi}}.$$

Before and after the spreading function has been applied, the area of the distribution ($dW_f$/dLogM) as a function of Log(M) is normalized to 1. Express two weight-fraction distributions, $dW_{f-HMW}$ and $dW_{f-LMW}$, for the HMW copolymer component fraction and the LMW copolymer component fraction, respectively, with two unique $M_w$ target values, $M_{w-HMW}$ and $M_{w-LMW}$, respectively, and with overall component compositions $A_{HMW}$ and $A_{LMW}$, respectively. Both distributions were broadened with independent widths, $\sigma$ (i.e., $\sigma_{HMW}=\sigma_{LMW}$, respectively). The two distributions were summed as follows: $dW_f=A_{HMW}dW_{fHMW}+A_{LMW}dW_{fLMW}$, wherein $A_{HMW}+A_{LMW}=1$. Interpolate the weight fraction result of the measured (from conventional GPC) GPC molecular weight distribution along the 501 log M indices using a $2^{nd}$-order polynomial. Use Microsoft Excel™ 2010 Solver to minimize the sum of squares of residuals for the equally-spaces range of 501 Log M indices between the interpolated chromatographically determined molecular weight distribution and the three broadened Flory distribution components ($\sigma_{HMW}$ and $\sigma_{LMW}$), weighted with their respective component compositions, $A_{HMW}$ and $A_{LMW}$. The iteration starting values for the components are as follows: Component 1: Mw=30,000, $\sigma$=0.300, and A=0.500; and Component 2: Mw=250,000, $\sigma$=0.300, and A=0.500. The bounds for components $\sigma_{HMW}$ and $\sigma_{LMW}$ are constrained such that $\sigma$>0.001, yielding an $M_w/M_n$ of approximately 2.00 and $\sigma$<0.500. The composition, A, is constrained between 0.000 and 1.000. The $M_w$ is constrained between 2,500 and 2,000,000. Use the "GRG Nonlinear" engine in Excel Solver™ and set precision at 0.00001 and convergence at 0.0001. Obtain the solutions after convergence (in all cases shown, the solution converged within 60 iterations).

Density is measured according to ASTM D792-08, *Standard Test Methods for Density and Specific Gravity (Relative Density) of Plastics by Displacement*, Method B (for testing solid plastics in liquids other than water, e.g., in liquid 2-propanol). Report results in units of grams per cubic centimeter (g/cm$^3$).

Elmendorf Tear Test Method: measured according to ASTM D1922-09, *Standard Test Methods for Propagation Tear Resistance of Plastic Film and Thin Sheeting by Pendulum Method*, Type B (constant radius). (Technically equivalent to ISO 6383-2.) Report results as normalized tear in cross direction (CD) or machine direction (MD) in gram-force (gf).

Gel permeation chromatography (GPC) Test Method (conventional GPC): Use a PolymerChar GPC-IR (Valencia, Spain) high temperature GPC chromatograph equipped with an internal IR5 infra-red detector (IR5, measurement channel). Set temperatures of the autosampler oven compartment at 160° C. and column compartment at 150° C. Use a column set of four Agilent "Mixed A" 30 cm 20-micron linear mixed-bed columns; solvent is 1,2,4 trichlorobenzene (TCB) that contains 200 ppmw of butylated hydroxytoluene (BHT) sparged with nitrogen. Injection volume is 200 microliters. Set flow rate to 1.0 milliliter/minute. Calibrate the column set with at least 20 narrow molecular weight distribution polystyrene (PS) standards (Agilent Technologies) arranged in six "cocktail" mixtures with approximately a decade of separation between individual molecular weights with molecular weights ranging from 580 to 8,400,000 in each vial. Convert the PS standard peak molecular weights to polyethylene molecular weights using the method described in Williams and Ward, J. Polym. Sci., Polym. Let., 6, 621 (1968) and equation 1: ($M_{polyethylene}$=A×($M_{polystyrene}$)B (EQ1), wherein $M_{polyethylene}$ is molecular weight of polyethylene, $M_{polystyrene}$ is molecular weight of polystyrene, A=0.4315, x indicates multiplication, and B=1.0; where MPE=MPS x Q, where Q ranges between 0.39 to 0.44 to correct for column resolution and band-broadening effects) based on a linear homopolymer polyethylene molecular weight standard of approximately 120,000 and a polydispersity of approximately 3, which is measured independently by light scattering for absolute molecular weight. Dissolve samples at 2 mg/mL in TCB solvent at 160° C. for 2 hours under low-speed shaking. Generate a baseline-subtracted infra-red (IR) chromatogram at each equally-spaced data collection point (i), and obtain polyethylene equivalent molecular weight from a narrow standard calibration curve for each point (i) from EQ1. Calculate number-average molecular weight ($M_n$ or $M_{n^{(GPC)}}$), weight-average molecular weight ($M_w$ or $M_{w^{(GPC)}}$), and z-average molecular weight ($M_z$ or $M_{z^{(GPC)}}$) based on GPC results using the internal IRS detector (measurement channel) with PolymerChar GPCOne™ software and equations 2 to 4, respectively:

equation 2
$$Mn_{(GPC)} = \frac{\sum_{i} IR_i}{\sum_{i}(IR_i/M_{polyethylene_i})};$$ (EQ2)

equation 3
$$Mw_{(GPC)} = \frac{\sum_{i}(IR_i * M_{polyethylene_i})}{\sum_{i} IR_i};$$ (EQ3)

equation 4
$$Mz_{(GPC)} = \frac{\sum_{i}(IR_i * M_{polyethylene_i}^2)}{\sum_{i}(IR_i * M_{polyethylene_i})}.$$ (EQ4)

Monitor effective flow rate over time using decane as a nominal flow rate marker during sample runs. Look for deviations from the nominal decane flow rate obtained during narrow standards calibration runs. If necessary, adjust the effective flow rate of decane so as to stay within ±2% of the nominal flow rate of decane as calculated according to equation 5: Flow rate(effective)=Flow rate(nominal) ($RV_{(FM\ Calculated)}/RV_{(FM\ Sample)}$ (EQ5), wherein Flow rate (effective) is the effective flow rate of decane, Flowrate (nominal) is the nominal flow rate of decane, $RV_{(FM\ Calibrated)}$ is retention volume of flow rate marker decane calculated for column calibration run using narrow standards, $RV_{(FM\ Sample)}$ is retention volume of flow rate marker decane calculated from sample run, * indicates mathematical multiplication, and/indicates mathematical division. Discard any molecular weight data from a sample run with a decane flow rate deviation more than ±2%.

Test Film Preparation Method: see examples below. Prior to testing, the film was conditioned for at least 40 hours (after film production) at 23°±2° C. and 50%±10% relative humidity.

High Load Melt Index (HLMI) $I_{21.6}$ Test Method: use ASTM D1238-10, *Standard Test Method for Melt Flow Rates of Thermoplastics by Extrusion Platometer*, using conditions of 190° C./21.6 kilograms (kg). Report results in units of grams eluted per 10 minutes (g/10 min.).

Melt Index ("$I_{5.0}$") Test Method: for ethylene-based (co) polymer is measured according to ASTM D1238-13, using conditions of 190° C.±5.0 kg.

Melt Flow Ratio MFR5: ("$I_{21.6}/I_{5.0}$") Test Method: calculated by dividing the value from the HLMI $I_{21.6}$ Test Method by the value from the Melt Index $I_{5.0}$ Test Method.

Melt Storage Modulus Test Method: On polymer melts at 190° C. perform small-strain (10%) oscillatory shear at varying frequency from 0.01 radian per second (rad/s) to about 100 rad/s using Dynamic Mechanical Spectroscopy (DMS) with an ARES-G2 Advanced Rheometric Expansion System, from TA Instruments, with parallel-plate geometry to obtain the G' (G"=3,000 Pa) value in pascals of melt storage modulus (G) at a dynamic frequency where loss modulus (G") is equal to 3,000 Pa.

EXAMPLES

Needful Bimodal HDPE Resins 1 to 4 were sequentially made in a single reactor by transitioning from (0) a prior resin being made therein by a prior set of polymerization (reactor) conditions in a prior run to (1) a first set of polymerization (reactor) conditions in run 1 to (2) a second set of such conditions in run 2 to (3) a third set of such conditions in run 3 and to (4) a fourth set of such conditions in run 4. The runs 1 to 4 were conducted in a pilot scale fluidized bed gas phase polymerization reactor (Pilot Reactor) that comprises a reactor vessel containing a fluidized bed of a powder of the bimodal polyethylene copolymer composition, and a distributor plate disposed above a bottom head, and defining a bottom gas inlet, and having an expanded section, or cyclone system, at the top of the reactor vessel to decrease amount of resin fines that may escape from the fluidized bed. The expanded section defines a gas outlet. The Pilot Reactor further comprises a compressor blower of sufficient power to continuously cycle or loop gas around from out of the gas outlet in the expanded section in the top of the reactor vessel down to and into the bottom gas inlet of the Pilot Reactor and through the distributor plate and fluidized bed. The Pilot Reactor further comprises a cooling system to remove heat of polymerization and maintain the fluidized bed at a target temperature. Compositions of gases such as ethylene, hydrogen, and 1-alkene being fed into the Pilot Reactor are monitored by an in-line gas chromatograph in the cycle loop in order to maintain specific concentrations that define and enable control of polymer properties. The gases may be cooled, resulting in their temperature dropping below their dew point, at which time the Pilot Reactor is in condensing mode operation (CMO) or induced condensing mode operation (ICMO). In CMO, liquids are present downstream of the cooler and in the bottom head below the distributor plate. In each run the catalyst was a silica-supported bimodal catalyst system containing a combination of bis(butylcyclopentadienyl)zirconium dimethyl and bis(2-(pentamethylphenylamido)ethyl)-amine zirconium dibenzyl, which bimodal catalyst system is available as PRODIGY™ BMC-300 from Univation Technologies, LLC, a subsidiary of The Dow Chemical Company, Midland, Michigan, USA. In each run the 1-alkene was 1-butene and the isopentane was 7 mol %. The polymerization/reactor conditions for runs 1 to 4 are shown below in Table 1.

having a $M_w$ of 19,0762 g/mol and an HMW poly(ethylene-1-butene) copolymer constituent having $M_w$ of 579,035 g/mol.

Needful Birodal HDPE Resin 4: a needful bimodal high-density poly(ethylene-1-butene) copolymer resin having an LMW poly(ethyene-1-butene) copolymer constituent having a $M_w$ of 28,067 g/mol and an HMW poly(ethyene-1-butene) copolymer constituent having $M_w$ of 650,498 g/mol.

The Needful Bimodal HDPE Resins 1 to 4 have the properties shown in Table 2.

TABLE 2

Properties of Needful Bimodal HDPE (CCB-HDPE) Resins 1 to 4 (before oxygen tailoring).

| Property | CCB-HDPE Resin 1 | CCB-HDPE Resin 2 | CCB-HDPE Resin 3 | CCB-HDPE Resin 4 |
| --- | --- | --- | --- | --- |
| Overall Composition Density (g/cm$^3$) | 0.9492 | 0.9490 | 0.9492 | 0.9494 |
| Overall Composition $I_{21.6}$ (g/10 min.) | 8.8 | 9.2 | 9.3 | 8.8 |
| Overall Composition MFR5 ($I_{21.6}/I_{5.0}$) | 31.5 | 34.0 | 32.7 | 35.8 |
| Overall Composition $M_n$ (g/mol) | 10,081 | 10,608 | 11,088 | 13,967 |
| Overall Composition $M_w$ (g/mol) | 318,458 | 332,176 | 339,579 | 358,489 |
| Overall Composition $M_z$ (g/mol) | 2,357,783 | 2,502,197 | 2,801,711 | 3,160,651 |
| HMW Constituent $M_n$ (g/mol) | 100,108 | 120,093 | 119,529 | 156,504 |
| HMW Constituent $M_w$ (g/mol) | 527,226 | 583,069 | 579,354 | 650,498 |
| HMW Constituent $M_z$ (g/mol) | 1,765,856 | 1,827,803 | 1,816,753 | 1,823,895 |
| LMW Constituent $M_n$ (g/mol) | 4,261 | 4,939 | 5,120 | 7,456 |
| LMW Constituent $M_w$ (g/mol) | 15,160 | 18,062 | 19,076 | 28,067 |
| LMW Constituent $M_z$ (g/mol) | 42,262 | 51,490 | 55,369 | 81,338 |
| Molecular weight spread ($M_w$-HMW/$M_w$-LMW) | 34.8 | 32.3 | 30.4 | 23.2 |
| Amount of HMW constituent (wt %) | 54.2 | 50.0 | 50.0 | 44.1 |
| Amount of LMW constituent (wt %) | 45.8 | 50.0 | 50.0 | 55.9 |
| Overall melt storage modulus G' (at G" = 3000 pascals) (Pascals) | 1155 | 1189 | 1181 | 1200 |
| Overall complex viscosity ratio (shear thinning) SH1000 (Eta*0.10/Eta*100) | 37.6 | 42.3 | 41.4 | 46.9 |
| MLS350 Bubble stability (pass/fail) | Fail | Fail | Fail | Fail |

TABLE 1

Polymerization conditions of runs 1 to 4 used to make needful bimodal HDPE resins 1 to 4 (described later).

| Polymerization/Reactor conditions | Run 1 | Run 2 | Run 3 | Run 4 |
| --- | --- | --- | --- | --- |
| Monomer (ethylene = $C_2$) | $C_2$ | $C_2$ | $C_2$ | $C_2$ |
| Comonomer (1-butene = $C_4$) | $C_4$ | $C_4$ | $C_4$ | $C_4$ |
| Bed temperature (° C.) | 90 | 90 | 93 | 100 |
| $C_4/C_2$ molar ratio | 0.012 | 0.013 | 0.013 | 0.013 |
| $H_2/C_2$ molar ratio | 0.0040 | 0.0034 | 0.0034 | 0.0025 |
| Isopentane concentration (mol %) | 7 | 7 | 7 | 7 |
| Polymer residence time (hours) | 3.6 | 3.9 | 3.8 | 4.0 |

Needful Bimodal HDPE Resin 1: a needful bimodal high-density poly(ethylene-1-butene) copolymer resin having an LMW poly(ethylene-1-butene) copolymer constituent having a $M_w$ of 15,160 g/mol and an HMW poly(ethylene-1-butene) copolymer constituent having $M_w$ of 527,226 g/mol.

Needful Bimodal HDPE Resin 2: a needful bimodal high-density poly(ethylene-1-butene) copolymer resin having an LMW poly(ethylene-1-butene) copolymer constituent having a $M_w$ of 18,062 g/mol and an HMW poly(ethylene-1-butene) copolymer constituent having $M_w$ of 583,069 g/mol.

Needful Bimodal HDPE Resin 3: a needful bimodal high-density poly(ethylene-1-butene) copolymer resin having an LMW poly(ethylene-1-butene) copolymer constituent The following additives were added to the resins before oxygen tailoring the resins: 1000 ppm by weight of antioxidant pentaerythritol tetrakis(3-(3,5-di-tert-butyl-4-hydroxyphenyl)propionate which was obtained as IRGANOX 1010 from BASF, 200 ppm of tris(2,4-di-tert-butylphenyl)phosphite which was obtained as IRGAFOS 168 from BASF, and 1000 ppm of calcium stearate.

Oxygen-Tailored Bimodal HDPE Resins 1A to 1C were made by oxygen-tailoring Needful Bimodal HDPE Resin 1 under various oxygen-tailoring conditions as shown below in Table 3 and have resin properties shown below in Table 4.

Oxygen-Tailored Bimodal HDPE Resins 2A to 2C were made by oxygen-tailoring Needful Bimodal HDPE Resin 2 under various oxygen-tailoring conditions as shown below in Table 3 and have resin properties shown below in Table 5.

Oxygen-Tailored Bimodal HDPE Resins 3A to 3C were made by oxygen-tailoring Needful Bimodal HDPE Resin 3 under various oxygen-tailoring conditions as shown below in Table 3 and have resin properties shown below in Table 6.

Oxygen-Tailored Bimodal HDPE Resins 4A to 4B were made by oxygen-tailoring Needful Bimodal HDPE Resin 4 under various oxygen-tailoring conditions as shown below in Table 3 and have resin properties shown below in Table 7.

The Oxygen-Tailored Bimodal HDPE Resins 1A to 1C, 2A to 2C, 3A to 3C, and 4A and 4B were melted, attempts were made to blow the melts into films under film blowing conditions. The films, if made, were tested for bubble stability according to the Bubble Stability Test Method. The extruder conditions for each resin are shown below in Table 3. All of the Oxygen-Tailored Bimodal HDPE Resins 1A to 1C, 2A to 2C, 3A to 3C, and 4A and 4B passed the STD bubble stability test. Oxygen-Tailored Bimodal HDPE Resins 1B, 1C, 2B, 2C, 3A to 3C, and 4A and 4B passed the MLS250 bubble stability test and Oxygen-Tailored Bimodal HDPE Resins 1A and 2A failed the MLS250 bubble stability test. The MLS350 bubble stability test results are reported later in Tables 4 to 7.

TABLE 3

Film Blowing Conditions used in Bubble Stability Test Method.

| Oxygen-Tailored Bimodal HDPE Resin | Motor (%) | Melt Temp. (° C.) | Melt Pressure (MPa) |
|---|---|---|---|
| 1A | 68.9 | 191.3 | 57.54 |
| 1B | 69.7 | 191.3 | 59.75 |
| 1C | 69.7 | 192.7 | 60.57 |
| 2A | 66.8 | 191.4 | 55.62 |
| 2B | 67.6 | 189 | 54.87 |
| 2C | 67.0 | 190.5 | 55.31 |
| 3A | 65.4 | 189.9 | 52.95 |
| 3B | 67.2 | 189.4 | 53.81 |
| 3C | 67.4 | 189.8 | 54.46 |
| 4A | 68.6 | 190.7 | 53.36 |
| 4B | 66.4 | 191.3 | 52.10 |

TABLE 4

Properties of Oxygen-tailored bimodal HDPE resins 1A to 1C.

| | $O_2$-tailored Resin 1A (Comparative) | $O_2$-tailored Resin 1B (Inventive) | $O_2$-tailored Resin 1C (Inventive) |
|---|---|---|---|
| Conc., X, of $O_2$ in Oxygen tailoring mixture (vol %) | 4 | 7 | 10 |
| Overall melt elasticity (G'/G" at 0.1 rad/s) | 0.616 | 0.633 | 0.641 |
| Overall melt storage modulus G' (at G" = 3000 pascals) (Pascals) | 1510 | 1570 | 1610 |
| Overall complex viscosity ratio (shear thinning) SH1000 (Eta*0.10/Eta*100) | 41.8 | 42.9 | 43.0 |
| MLS350 Bubble stability (pass/fail) | Fail | Pass | Pass |
| Overall Composition $I_{21.6}$ (g/10 min.)~ | 8.7 | 8.4 | 7.8 |
| Overall Composition MFR5 ($I_{21.6}/I_{5.0}$)~ | 30.8 | 31.1 | 30.7 |

TABLE 5

Properties of Oxygen-tailored bimodal HDPE resins 2A to 2C.

| | $O_2$-tailored Resin 2A (Comparative) | $O_2$-tailored Resin 2B (Inventive) | $O_2$-tailored Resin 2C (Inventive) |
|---|---|---|---|
| Conc., X, of $O_2$ in Oxygen tailoring mixture (vol %) | 4 | 7 | 10 |
| Overall melt elasticity (G'/G" at 0.1 rad/s) | 0.635 | 0.653 | 0.675 |
| Overall melt storage modulus G' (at G" = 3000 pascals) (Pascals) | 1506 | 1587 | 1665 |
| Overall complex viscosity ratio (shear thinning) SH1000 (Eta*0.10/Eta*100) | 46.2 | 47.1 | 48.3 |
| MLS350 Bubble stability (pass/fail) | Fail | Pass | Pass |
| Overall Composition $I_{21.6}$ (g/10 min.)~ | 8.8 | 9.0 | 8.9 |
| Overall Composition MFR5 ($I_{21.6}/I_{5.0}$)~ | 33.8 | 35.1 | 34.3 |

TABLE 6

Properties of Oxygen-tailored bimodal HDPE resins 3A to 3C.

| | $O_2$-tailored Resin 3A (Comparative) | $O_2$-tailored Resin 3B (Comparative) | $O_2$-tailored Resin 3C (Inventive) |
|---|---|---|---|
| Conc., X, of $O_2$ in Oxygen tailoring mixture (vol %) | 4 | 7 | 10 |
| Overall melt elasticity (G'/G" at 0.1 rad/s) | 0.636 | 0.634 | 0.673 |
| Overall melt storage modulus G' (at G" = 3000 pascals) (Pascals) | 1537 | 1548 | 1698 |
| Overall complex viscosity ratio (shear thinning) SH1000 (Eta*0.10/Eta*100) | 45.7 | 45.0 | 47.2 |
| MLS350 Bubble stability (pass/fail) | Fail | Fail | Pass |
| Overall Composition $I_{21.6}$ (g/10 min.)~ | 9.4 | 9.8 | 9.7 |
| Overall Composition MFR5 ($I_{21.6}/I_{5.0}$)~ | 34.4 | 33.5 | 34.5 |

TABLE 7

Properties of Oxygen-tailored bimodal HDPE resins 4A to 4B.

| | $O_2$-tailored Resin 4A (Comparative) | $O_2$-tailored Resin 4B (Comparative) |
|---|---|---|
| Conc., X, of $O_2$ in Oxygen tailoring mixture (vol %) | 4 | 7 |
| Overall melt elasticity (G'/G" at 0.1 rad/s) | 0.654 | 0.680 |
| Overall melt storage modulus G' (at G" = 3000 pascals) (Pascals) | 1538 | 1653 |
| Overall complex viscosity ratio (shear thinning) SH1000 (Eta*0.10/Eta*100) | 49.7 | 50.7 |
| MLS350 Bubble stability (pass/fail) | Fail | Fail |
| Overall Composition $I_{21.6}$ (g/10 min.)~ | 9.4 | 10.1 |
| Overall Composition MFR5 ($I_{21.6}/I_{5.0}$)~ | 35.6 | 38.2 |

As shown in Tables 4 to 7, the comparative oxygen-tailored bimodal HDPE resins do not have both a melt storage modulus G' (at G"=3000 pascals) in the inventive range from 1565 to 1900 pascals and a complex viscosity ratio SH1000 in the inventive range from 38.0 to 50.0, and therefore the comparative films thereof failed the stringent MLS350 bubble stability test. In advantageous contrast, the inventive oxygen-tailored bimodal HDPE resins had both a melt storage modulus G' (at G"=3000 pascals) in the inventive range from 1565 to 1900 pascals and a complex viscosity ratio SH1000 in the inventive range from 38.0 to 50.0, and therefore the inventive films thereof passed the stringent MLS350 bubble stability test. The method uses advanced rheological properties from dynamic mechanical spectroscopy (DMS), but analyzes the data in a different way that is more sensitive to changes in resin composition and properties. Thus, the present method of increasing bubble stability of a needful bimodal HDPE resin in need thereof beneficially uses an amount of oxygen tailoring based on the resin's molecular weight spread to simultaneously control both the resin's melt storage modulus G' (at G"=3000 pascals) and complex viscosity ratio SH1000. This method makes minor changes (no more than 50%) in both the resin's melt storage modulus G' (at G"=3000 pascals) and complex viscosity ratio SH1000, and yet achieves a targeted increase in MLS350 bubble stability of the resin.

Figure 1:
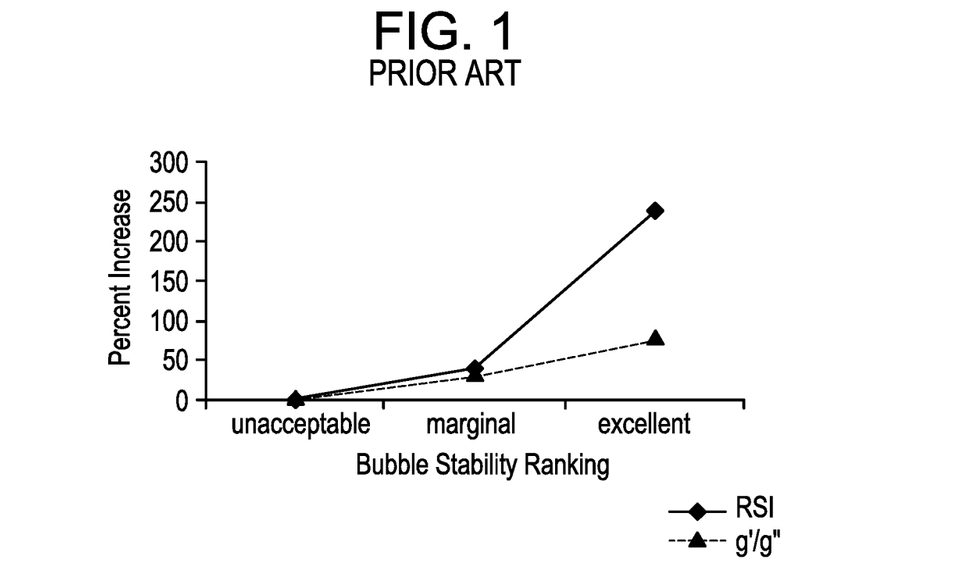
FIG. 1: a replication of prior art FIG. 2 of Neubauer (US 2011/0178262 A1).
Figure 2:
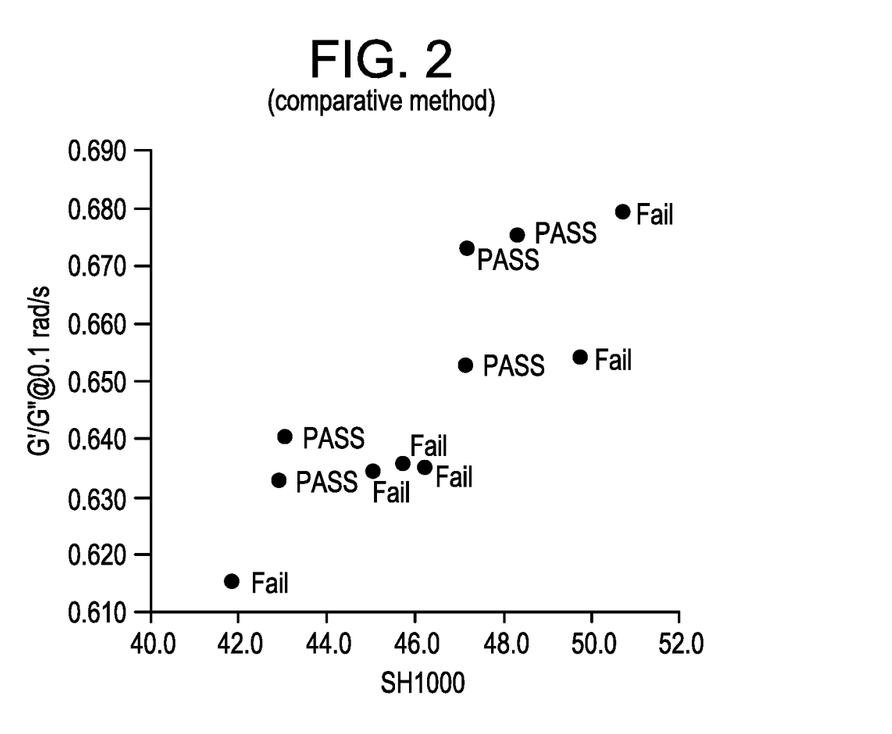
FIG. 2: a plot of oxygen tailoring results of a comparative method using melt elasticity (G'/G" at 0.1 rad/s) versus complex viscosity ratio SH1000 for oxygen-tailoring bimodal HDPE resins.
Figure 3:
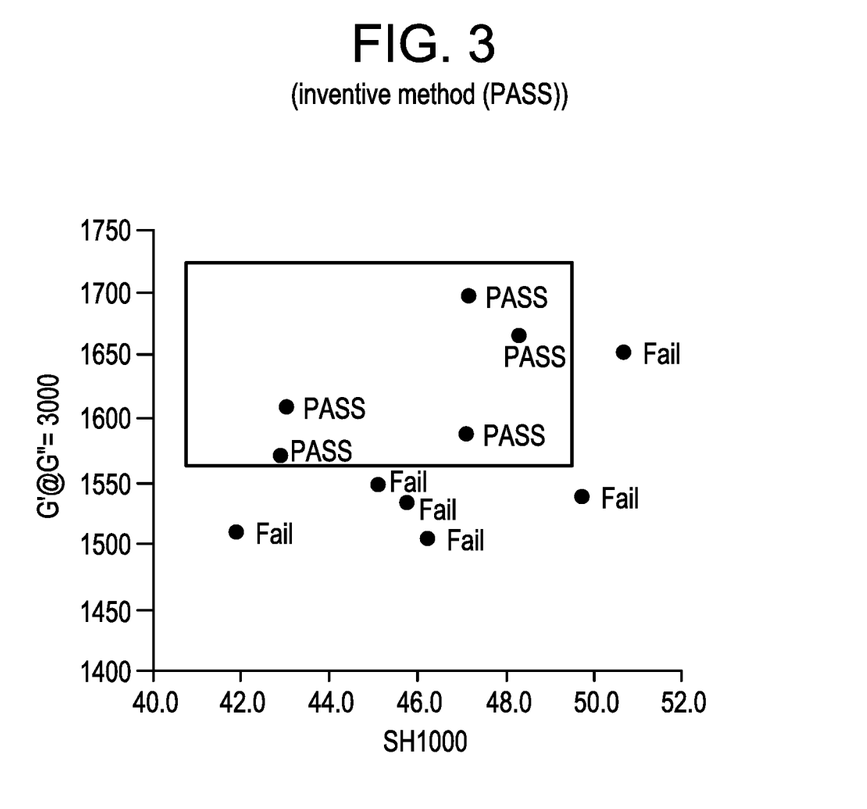
FIG. 3: a plot of oxygen tailoring results of the inventive melt storage modulus G' (at G"=3000 pascals) versus complex viscosity ratio SH1000 for inventive oxygen-tailored bimodal HDPE resins 1B, 1C, 2B, 2C, and 3C and plotted for contrast against comparative oxygen-tailored bimodal HDPE resins 1A, 2A, 3A, 3B, 4A, and 4B.

The results of the present method may be compared with those of prior methods. The prior methods are not configured to increase bubble stability of a needful bimodal HDPE resin. FIG. 1 is a replication of prior art FIG. 2 of Neubauer (US 2011/0178262 A1) and shows results of a first non-inventive method that uses RSI values alone and a second non-inventive method that uses melt elasticity (G'/G" at 0.1 rad/s) alone for oxygen-tailoring bimodal HDPE resins. FIG. 2 is a plot of results of a third non-inventive method that uses a combination of melt elasticity (G'/G" at 0.1 rad/s) and complex viscosity ratio SH1000 for oxygen-tailoring bimodal HDPE resins. FIG. 3 is a plot of results of the inventive method that uses molecular weight spread and a combination of melt storage modulus G' (at G"=3000 pascals) and complex viscosity ratio SH1000 for oxygen-tailoring needful bimodal HDPE resins. In FIG. 3, the inventive oxygen-tailored bimodal HDPE resins 1B, 1C, 2B, 2C, and 3C are indicated by "pass" and the non-inventive oxygen-tailored bimodal HDPE resins 1A, 2A, 3A, 3B, 4A, and 4B are indicated by "fail". The inventive method may be used for compositional changes rather than the non-inventive methods.

The inventive method made inventive oxygen-tailored bimodal HDPE resins 1B, 1C, 2B, 2C, and 3C and films thereof. The inventive films have a beneficial combination of impact and tear properties comprising a dart drop impact of 260 grams (g) or greater (e.g., from 261 to 321 g), an Elmendorf tear in machine direction (MD) of 23 grams (g) or greater (e.g., from 24 to 29 g), and an Elmendorf tear in cross direction (CD) of 31 grams (g) or greater (e.g., from 32 to 51 g). The dart drop impact and tear properties are measured by the respective test methods described earlier. Thus, the inventive films are useful in film applications such as packaging and medical.

The invention claimed is:

1. A method of increasing bubble stability of a needful bimodal high-density polyethylene (HDPE) resin that comprises a higher molecular weight (HMW) polyethylene polymer constituent and a lower molecular weight (LMW) polyethylene polymer constituent and has an overall density from 0.935 to 0.970 gram per cubic centimeter (g/cm$^3$) and an overall weight-average molecular weight ($M_w$) from 200,000 to 450,000 grams per mole (g/mol), which needful bimodal HDPE resin is in need of increased bubble stability because the properties of the needful bimodal HDPE resin are different than those of a prior resin made in the same reactor due to change in reactor conditions and the needful bimodal HDPE resin has a first melt storage modulus G' (at loss modulus G"=3000 pascals) of less than 1501 pascals and a first complex viscosity ratio SH1000 of from 33.0 to 49.0, the method comprising:

contacting under oxygen-tailoring conditions a melt of the needful bimodal HDPE resin with an oxygen-tailoring mixture consisting essentially of a tailoring effective amount of molecular oxygen gas ($O_2$) and one or more inert gases, and wherein during the contacting the melt is at a temperature from 235° to 251° C., so as to make an oxygen-tailored bimodal HDPE resin having a second melt storage modulus G' (at G"=3000 pascals) of from 1565 to 1900 pascals and a second complex viscosity ratio SH1000 of from 38.0 to 50.0;

wherein density is measured according to ASTM D792-13, Method B;

wherein $M_w$ is measured according to the Gel Permeation Chromatography (GPC) Test Method;

wherein each melt storage modulus G' (at G"=3000 pascals) is measured according to the Melt Storage Modulus Test Method; and wherein each complex viscosity ratio SH1000 is equal to Eta*0.10/Eta*100, wherein Eta*0.10 is complex viscosity in pascal-seconds (Pa-s) measured at 0.10 radian per second (rad/s) and wherein Eta*100 is complex viscosity in Pa-s measured at 100 rad/s, both measured according to Dynamic Mechanical Analysis Test Method.

2. The method of claim 1 wherein the tailoring effective amount of the $O_2$ gas in the contacting step is as described by any one of limitations (i) to (ii): (i) an $O_2$ gas concentration of X volume percent (vol %) of the oxygen-tailoring mixture; and (ii) an amount of the $O_2$ gas is Y weight parts per 1 million weight parts of the needful bimodal HDPE resin (ppmw).

3. The method of claim 1 wherein the oxygen-tailoring mixture has an $O_2$ gas concentration of X volume percent (vol %), and wherein the oxygen-tailoring conditions comprise any one of limitations (i) to (iv): (i) the melt is at a temperature from 235° to 245° C.; (ii) the melt is at a temperature from 236° and 241° C.; (iii) the one or more inert gases of the oxygen-tailoring mixture is molecular nitrogen ($N_2$), argon, helium, $CO_2$, one or more alkane(s), or a combination of any two or more thereof; and (iv) both (iii) and any one of (i) and (ii).

4. The method of claim 1 wherein the oxygen-tailored bimodal HDPE resin further has any one of limitations (i) to (iii): (i) the second melt storage modulus G' (at G"=3000) is from 1565 to 1800 pascals; (ii) the second complex viscosity ratio SH1000 is from 40 to 49.4; (iii) both (i) and (ii).

5. The method of claim 1 wherein the oxygen-tailored bimodal HDPE resin passes a MLS350 bubble stability test determined according to the Bubble Stability Test Method.

6. The method of claim 1 wherein the needful bimodal HDPE resin has any one of limitations (i) to (vi): (i) the overall density is from 0.940 to 0.960 g/cm$^3$; (ii) the overall $M_w$ is from 250,000 to 400,000 g/mol; (iii) the first melt storage modulus G' (at G"=3000 pascals) is from 1001 to 1300 pascals; (iv) the first complex viscosity ratio SH1000 is from 35.0 to 48.0; (v) an overall high-load melt index (HLMI or $I_{21.6}$) of from 8.0 to 10.0 grams per 10 minutes (g/10 min.); and (vi) an overall melt flow ratio-5 (MFR5 or $I_{21.6}/I_{5.0}$) from 25 to 45; wherein the $I_{21.6}$ is measured according to ASTM D1238-13, using conditions of 190° C./21.6 kilograms (kg); and wherein the $I_{5.0}$ is measured according to ASTM D1238-13, using conditions of 190° C./5.0 kg.

7. The method of claim 1 further comprising preliminary steps (A) and (B) before the contacting step:

(A) determining a molecular weight spread of the needful bimodal HDPE resin, wherein the molecular weight spread is (a1) a ratio of weight-average molecular weight of the HMW polyethylene polymer constituent to weight-average molecular weight of the LMW polyethylene polymer constituent ($M_{w\text{-}HMW}/M_{w\text{-}LMW}$);

(B) determining the tailoring effective amount of molecular oxygen gas ($O_2$) that is effective in the contacting step as a function of the determined molecular weight spread of the needful bimodal HDPE resin.

8. The method of claim 7 wherein the needful bimodal HDPE resin further has any one of limitations (i) to (iii): (i) the molecular weight spread is (a1) the ratio $M_{w\text{-}HMW}/M_{w\text{-}LMW}$, wherein $M_{w\text{-}HMW}/M_{w\text{-}LMW}$ is from 23 to 45; (ii) the molecular weight spread is (a2) a ratio of number-average molecular weight of the HMW polyethylene polymer constituent to number-average molecular weight of the LMW polyethylene polymer constituent ($M_{n\text{-}HMW}/M_{n\text{-}LMW}$), wherein $M_{n\text{-}HMW}/M_{n\text{-}LMW}$ is from 18 to 30; (iii) the molecular weight spread is (a3) a ratio of z-average molecular weight of the HMW polyethylene polymer constituent to z-average molecular weight of the LMW polyethylene polymer constituent ($M_{z\text{-}HMW}/M_{z\text{-}LMW}$), wherein $M_{z\text{-}HMW}/M_{z\text{-}LMW}$ is from 18 to 45; wherein $M_w$, $M_n$, and $M_z$ are measured according to the Gel Permeation Chromatography (GPC) Test Method.

9. An oxygen-tailored bimodal HDPE resin made by the method of claim 1.

10. A blown film comprising the oxygen-tailored bimodal HDPE resin of claim 9.

11. A method of determining whether a bimodal high-density polyethylene (HDPE) resin that comprises a higher molecular weight (HMW) polyethylene polymer constituent and a lower molecular weight (LMW) polyethylene polymer constituent and has an overall density from 0.935 to 0.970 gram per cubic centimeter (g/cm$^3$) and an overall weight-average molecular weight ($M_w$) from 200,000 to 450,000 grams per mole (g/mol), is in need of increased bubble stability, the method comprising measuring melt storage modulus G' (at loss modulus G"=3000 pascals) and complex viscosity ratio (shear thinning) SH1000 of the needful bimodal HDPE resin, and determining the bimodal HDPE resin is a need of increased bubble stability if the melt storage modulus G' (at loss modulus G"=3000 pascals) is less than 1501 pascals and the complex viscosity ratio (shear thinning) SH1000 is from 33.0 to 49.0; wherein density is measured according to ASTM D792-13, Method B; wherein Mw is measured according to the Gel Permeation Chromatography (GPC) Test Method; wherein each melt storage modulus G' (at G"=3000 pascals) is measured according to the Melt Storage Modulus Test Method; and wherein each complex viscosity ratio SH1000 is equal to Eta*0.10/Eta*100, wherein Eta*0.10 is complex viscosity in pascal-seconds (Pa-s) measured at 0.10 radian per second (rad/s) and wherein Eta*100 is complex viscosity in Pa-s measured at 100 rad/s, both measured according to Dynamic Mechanical Analysis Test Method.

* * * * *